March 4, 1958     F. R. COLLBOHM     2,825,900
DIRECTIONAL RECEIVER
Filed Feb. 17, 1950     7 Sheets-Sheet 1

FRANK R. COLLBOHM,
INVENTOR.

BY
Gerald H. Peterson
ATTORNEY.

RELATIVE ELEVATION PATTERN (POWER)
OF PRIMARY AND AUXILIARY ANTENNAS

ABSOLUTE AZIMUTH PATTERNS (POWER) OF PRIMARY AND AUXILIARY ANTENNAS

FRANK R. COLLBOHM, INVENTOR.

March 4, 1958 F. R. COLLBOHM 2,825,900
DIRECTIONAL RECEIVER
Filed Feb. 17, 1950 7 Sheets-Sheet 4

FRANK R. COLLBOHM,
INVENTOR.

BY
ATTORNEY.

March 4, 1958     F. R. COLLBOHM     2,825,900
DIRECTIONAL RECEIVER
Filed Feb. 17, 1950     7 Sheets-Sheet 5
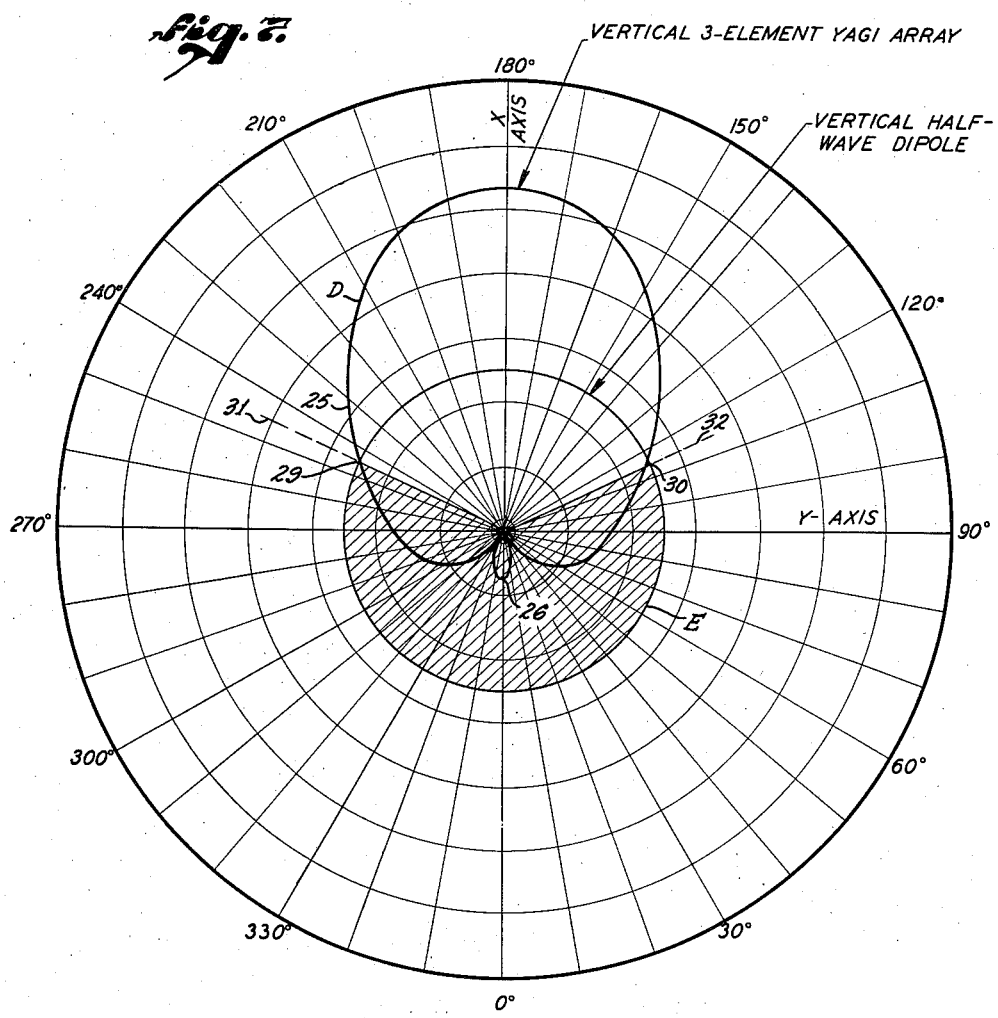
HORIZONTAL PLANE PATTERNS RELATIVE FIELD STRENGTH
FRANK R. COLLBOHM,
INVENTOR.
BY
ATTORNEY.

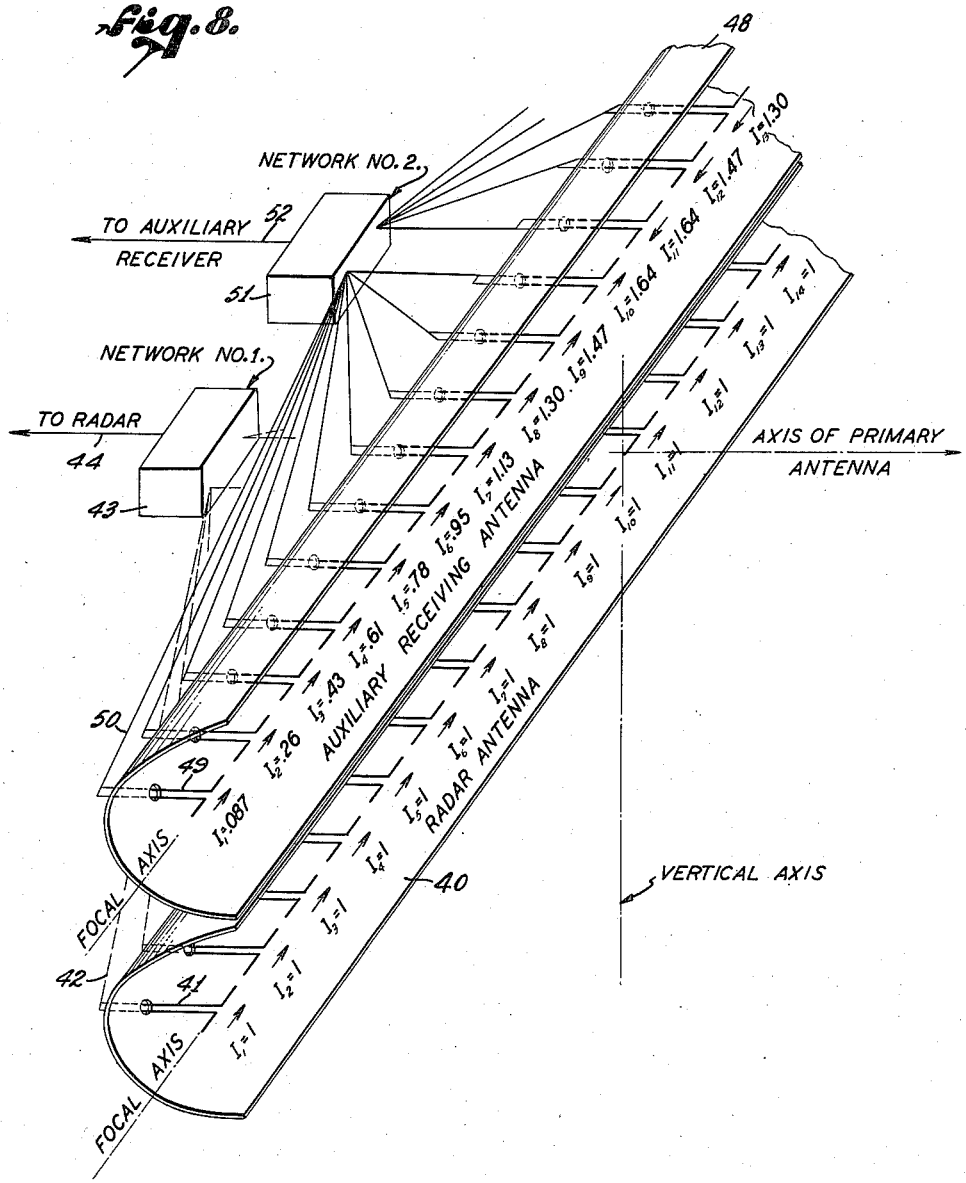

HORIZONTAL PLANE PATTERNS OF PRIMARY AND AUXILIARY CYLINDRICAL PARABOLOIDS

RELATIVE CURRENT DISTRIBUTIONS ALONG LINE SOURCES FEEDING PRIMARY AND SECONDARY CYLINDRICAL PARABOLOIDS

FRANK R. COLLBOHM, INVENTOR.

2,825,900

DIRECTIONAL RECEIVER

Franklin R. Collbohm, Santa Monica, Calif., assignor to The Rand Corporation, Santa Monica, Calif.

Application February 17, 1950, Serial No. 147,173

10 Claims. (Cl. 343—100)

This invention relates to a directional receiving system for use in receiving radiation, such as used in radar, radio, television, et cetera, and particularly useful for directional radar reception, and relates more particularly to a radar with a directive beam, such as a pencil-beam or shaped beam, having means for eliminating or attenuating the reception of reflections, echoes, or other signals from directions not part of the main directive beam.

In many applications in which radio waves are received, such as in radar, radio and television applications, it is desirable to receive or control reception from a desired or given direction and to avoid reception of signals or radiation from directions outside of the desired direction. This is especially true for directional radar reception.

In a directive-beam radar, the antenna is so designed to concentrate the energy radiated in a desired beam directed outwardly from the antenna, and the antenna with its directional beam is so coordinated with the observing or viewing scope of the radar so that when an indication of an object within the directive beam appears on the viewing device, its direction, or component thereof, such as azimuth, from the antenna is indicated on the viewing device. In order to obtain an accurate indication on the viewing scope of the direction of an object, ideally a directive radar antenna should concentrate all the power radiated into the desired directional beam defined by a limited range of values of the azimuthal and elevational angles and radiating no energy at all in other directions. However, such an ideal single-lobed radiation pattern cannot be realized with practical antennas of finite size because of the diffraction effects at the antenna aperture which result in field patterns consisting of a main lobe surrounded by a family of secondary lobes of reduced intensity. These secondary lobes are called side lobes and represent power radiated in undesired directions outside of the directive beam.

As is understood in the radar art, radiation emanating from the antenna in the main directive beam, whether in the form of pulses or continuous wave, upon striking an object within the main directive beam, is reflected back to the radar receiving antenna, which may be the same as the transmitting antenna or a separate antenna structure, and the reflection or echo is picked up or received by the radar to give an indication which includes direction coordinated with the direction of the main directive beam. Under some conditions, an object in the direction of a side lobe outside the main directive beam will reflect the radiation from the side lobe, and such reflected radiation will be picked up or received to give an indication on the radar appearing on the viewing scope incorrectly as if such object were in the direction of the main beam, because such a radar system is physically incapable of distinguishing between a reflection from a side lobe and a reflection from the main directive beam.

Even though only a small fraction of the total power radiated by the antenna is directed outside the main lobe, that is, in the side lobes, these side lobes of low intensity relative to the main lobe and in a direction outside of the main beam give false indications on the radar observing device and constitute a potential source of trouble in almost all radar applications. This is due to the fact that most radar receivers must be designed to operate over a tremendously wide range (from 10,000,000 to 100,000,000 fold) of echo return power so that even though the higest peak side-lobe power may be hundreds of times weaker than the peak main-beam power, it is possible for a strong signal coming in from a side-lobe direction and received in the side lobe to produce a greater response in the receiver than a weak signal coming from the direction of the main beam. Such a signal giving a false directional indication obviously leads to incorrect indications on the viewing scope.

An illustration of this difficulty appears in connection with surveillance radars. Surveillance radars are used to keep track of all aircraft within a radius of 100 to 200 miles or more from an airport or from the centroid of a group of airports. The received echo power from a given aircraft is proportional to the radar cross-section of the aircraft and inversely proportional to the fourth power of the slant range from radar to aircraft. The radar cross-section of an aircraft is a complicated function of its size, shape, and orientation with respect to the ray drawn from radar to aircraft, and may vary through extremes of 100 to 1, or more, with very slight changes in direction of incidence of the radar pulse with respect to the aircraft axes. There are still greater extremes between the radar cross-section of different aircraft; for example, the radar echoing area of a large transport aircraft viewed broadside may well be thousands of times greater than that of a pointed-nose jet fighter viewed nose on. Superposed upon this 100- to 1000-fold variation in radar return due to variations in shape and orientation of aircraft, is a 10,000- to 100,000-fold variation due to the fact that the range of the aircraft may be anything between a few miles and 100 to 200 miles, or more. It is evident that the radar response, at the receiver, of a large nearby aircraft in a favorable (for reflection) orientation may well be tens, or hundreds, of thousands of times more intense than that due to a small aircraft in a less favorable orientation. If the radar is sufficiently sensitive to detect the small aircraft when the latter is illuminated by the main beam, then it will also be sufficiently sensitive to detect a much larger radar target not only in directions corresponding to that of the main beam but also in directions corresponding to the peaks of most of the side lobes. The result is that a nearby aircraft may be indicated by a broad broken ring spread out on the P. P. I. over 90 to 180 degrees of azimuth, completely obscuring the returns from smaller targets at about the same range. This has the effect of substantially reducing the traffic-handling capacity of a surveillance radar.

As a further illustration of the type of difficulty which my invention will eliminate, the presence of an enemy airborne noise jammer would be indicated by a sector on the P. P. I. completely filled with noise "pips." If there were no side lobes in the pattern of the search radar antenna, the sector would be oriented in a direction corresponding to that of the jammer with respect to the radar, the angular width of the sector corresponding only to the angular width of the radar beam. While any actual target in this sector would be completely obscured by this noise, the rest of the scope would be free to present pips corresponding to all targets not in the same beam-width as the jammer. But if side lobes are present, the noise will be received on all the more intense of these, with the result that a large fraction of the P. P. I. display will be filled with noise "spokes"—corresponding to the main lobe and stronger side lobes—making the radar useless for search purposes over a wide range (90 to 180 degrees, or more) of azimuth angles. It will be understood, of course, that such a jammer, being a continuous-wave source modulated by random noise, produces a spoke on the P. P. I. corresponding to the direction of reception, and since the receiving radiation pattern of the radar antenna is the same as the transmitting pattern, a spoke will appear in each lobe of the radiation pattern of the antenna, including all the side lobes sufficiently large to take up the jamming signal as well as the main lobe.

Efforts have been made in the past to eliminate or reduce such effects of the side lobes in the radiation patterns of directive-beam antennas, but prior to my invention no satisfactory solution to the problems presented has been found. For example, the intensity of the side lobes in the field pattern of an aperture antenna can theoretically be greatly reduced in comparison to the intensity prevailing with conventional nearly-uniform aperture illuminations by tapering the intensity of the illumination over the aperture in such manner that the peripheral portions of the aperture received much less incident flux than does the central portion. If this taper is sufficiently extreme, the peak side-lobe intensity level can, in principle, be made arbitrarily small. However, this method has two serious practical disadvantages: (1) The reduction in side-lobe intensity is accompanied by a corresponding broadening of the main lobe, with resultant reduction of the power gain of the antenna and reduction of the tangular resolving power of the radar. (2) The accuracy with which the antenna must be constructed and the accuracy with which a particular tapered illumination must be maintained increase rapidly with decrease in the average allowable peak side-lobe intensity. The reduction of peak side-lobe level by more than ten or fifteen db below that corresponding to a uniform illumination requires the holding of tolerances impossibly fine for a physically large structure subject to various erratic mechanical stresses.

Still another effort to correct the effects of the side lobes described above has been by the use of a secondary radar system worked into an antenna having an omnidirectional (circular) azimuthal pattern, and an elevation pattern of the same shape as that of the primary radar antenna. The power output of the secondary transmitter is adjusted so that the signal radiated by the omnidirectional antenna is greater than that radiated in the strongest side lobe of the radar antenna. The pulse repetition frequencies of the two radars are synchronized so that pulses are radiated alternately by the two systems. The radar return from a target situated in the angular region bounded by the main lobe of the primary radar antenna will be greater on the primary receiver than on the secondary and will be presented on the P. P. I. in the usual manner; but the return from a target situated anywhere outside the main lobe of the primary antenna will be greater on the secondary receiver than on the primary, and a cancellation or amplitude-gating circuit prevents the weaker primary returns from being present on the scope. The result is effectively a single radar system having an antenna with no side lobes. However, this arrangement has many serious practical disadvantages: (1) The required power output of the secondary transmitter is too high relative to that of the primary radar, due to the fact that the secondary antenna has no directivity at all in azimuth and no more directivity in elevation than the primary antenna. (2) For search and surveillance radars having elevation patterns of the form $csc^2\theta$, where $\theta$ is the elevation angle, with a half-power beam-width of the order of 3 to 9°, it is exceedingly difficult if not practically impossible to design the required secondary antenna to have the required $csc^2\theta$ pattern throughout the required 360° of azimuth. (3) Serious difficulties will be caused by the effects of ground reflection on the elevation patterns of the two antennas, which must necessarily be located on the same vertical axis, one above the other. (4) The high-power omnidirectional secondary radar would serve as an effective beacon to enemy countermeasure search aircraft and be very vulnerable to detection and jamming.

Although this invention finds an important use especially for directional radar, it may also be used for other applications, such as for radio and television, wherever directional reception is desired.

Accordingly, it is an object of this invention to provide a directional receiving system in which reception from radiation coming from outside the desired direction will be eliminated.

It is another object of my invention to provide a directive beam radar system in which reception from radiation outside the main directive beam will be eliminated.

It is another object of my invention to provide a radar system having improved effective angular resolution, especially in both search and surveillance applications.

It is another object of my invention to provide a radar system with the effects of reception by the side lobes eliminated with no loss in power gain and no loss in angular resolution of the primary radar.

It is still another object of my invention to provide such a radar system which does not require fine tolerances in the construction or illumination of either the primary or secondary radiating systems.

It is still another object of my invention to provide such a radar system involving no waste in power to obtain the desired results, in that no more power is required than in the conventional radar system.

It is a further object of my invention to provide such a radar system that is no more vulnerable to detection by enemy search receivers than is the conventional primary radar, because side lobes are suppressed only on reception of incoming signals.

It is a still further object of my invention to provide such a radar system which, under certain conditions, will give improved performance when subjected to jamming.

Still other important objects and advantages of my invention will be apparent to those skilled in the art to which it appertains from the following description.

Especially with regard to intensity and direction of transmission and reception by an antenna, it is customary to refer to the radiation pattern of the antenna. Antennas are defined and designed, as known in the art, in terms of radiation pattern. When the radiation pattern of the antenna is given, the antenna is structurally designed in a manner known in the art to have the specified pattern and hence the radiation pattern specifies and defines the antenna. Since this invention is concerned with reception, it is important to note that the radiation pattern for transmission is identical with that for reception. Radiation pattern is the angular distribution of power radiated (or received) as represented on a graphical plot such as the figure resulting from the graphical representation on a three-dimsional plot in spherical coordinates, in which the angular coordinates $\theta$ and $\phi$ are those of the directions of reception or observation and the radical coordinate is proportional to $P(\theta,\phi)$ the power radiated (or received) per unit solid angle in the direction $\theta,\phi$. It is customary to normalize the radiation pattern to unity on the basis of the maximum of the pattern as unity, but since this invention is concerned with a comparison of the absolute values of the radiation pattern of each, the relative actual values of the patterns must be taken in account as well as the shapes.

In general, this invention for directional reception comprises a primary receiving system or receiving antenna arrangement having a radiation pattern preferably directional and an auxiliary receiving system or receiving antenna arrangement, the radiation pattern of which, in relative value of power distribution, envelops, that is, has power values greater than those of the primary, in the unwanted directions of reception, and has power values less than those of the primary in the wanted direction, or the wanted bundle of solid angles in space. The two receiving systems or antenna arrangements are provided with circuitry means for cutting out any incoming signal unless the signal from the primary receiving systems is greater than the signal from the auxiliary receiving system, so that signals are received only when in the direction in which the power values of the primary receiver are greater than those of the auxiliary receiver. In other words, a signal is received by both receiving systems or antenna arrangements and the output of the auxiliary receiver is used to control the threshold bias level of the primary receiver so that no signal is transmitted or passed to the indicator or other such device unless the signal from the primary receiver is stronger than that from the auxiliary receiver. These receiving systems or antenna arrangements may be made adjustable with respect to one another so that the respective radiation patterns may be adjusted relatively, as desired, to diminish or enlarge or change the shape of the directional region of reception, in accordance with the portion of the primary pattern in space which is greater than the auxiliary pattern, as defined or bounded by the intersection of these patterns in space.

For a radar application in accordance with my invention, I provide the primary radar with an auxiliary receiving system, including a radar receiver, such as that used for the primary radar, connected to a separate radiation receiving system which may be a separate receiving antenna or a separate receiving feed associated with the primary radar antenna. The radiation pattern of this secondary receiving radiation system is such that the power gain of this secondary radiation system will be greater than that of the primary receiving system in all directions lying outside of the main directive beam of the primary system and substantially less than that of the primary system in directions within the main directive lobe of the primary system. The output of the secondary receiver is arranged to control the threshold bias level of the primary radar receiver so that no output signal will be delivered to the radar indicating device unless the signal from the primary receiver is greater than that of the secondary or auxiliary receiver. The result of this arrangement is that there is no output signal to the radar indicator except that due to radiation received within the direction of the main beam, that is, within that section where the surface of the radiation pattern of the primary receiver falls outside of or extends beyond that of the secondary radiation receiving system, and radiation received from a direction outside the main lobe, that is, where the surface of the radiation pattern of the secondary or auxiliary radiation-receiving system is greater than that of the primary receiving system, will not be transmitted to the radar indicator because the signal received through the secondary radiation system is greater than that received through the primary system and the signal from such a direction is not transmitted to the indicator.

The operation of an arrangement made in accordance with my invention will be illustrated by the following: A pulse is sent out by the radar transmitter-antenna system in the usual manner, most of its energy being concentrated in the main lobe of the antenna with smaller amounts of energy radiated in the side lobes. The echo return from an object is received by both the primary radar antenna and the secondary radiation receiving system and the energy received by the primary antenna and the energy received by the secondary receiving system are respectively fed into the radar receiver and the secondary receiver. The output of the secondary receiver is used to control the threshold bias level of the radar receiver, so that if the return from a target at given range as received by the secondary receiver is stronger than that received from the same target by the radar receiver, the latter will deliver no output signal to the P. P. I. or other indicating device. On the other hand, if the received signal from a target at given range results in a greater input voltage on the radar receiver than on the secondary receiver, as will be the case if the target lies in the angular region of the radar antenna's main beam, the radar receiver input will exceed the threshold level set by the secondary receiver output biasing voltage and the radar receiver will deliver its output to the radar indicator.

My invention will be further illustrated and exemplified by the following description of specific embodiments thereof taken in conjunction with the accompanying drawings in which:

Figure 7 shows a polar plot in horizontal plane of the radiation pattern of the two antennas of Figure 6.

Figure 8 shows an arrangement of antennas in accordance with my invention in which the antenna system consists of a primary cylindrical reflector fed by a uniformly illuminated collinear array of dipoles and an identical auxiliary reflector fed by a similar collinear dipole array with illumination tapered as indicated.

Figure 1:
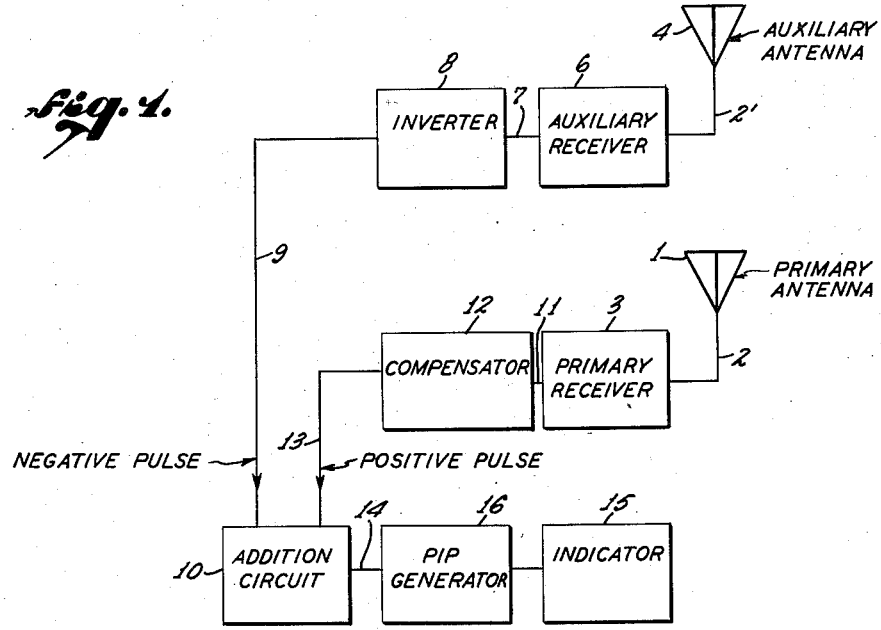
Figure 1 shows schematically a directional receiving system in accordance with my invention.

As shown particularly in Figure 1, the receiving system of my invention includes a customary primary radar radiation-transmitting and receiving directive-beam antenna 1 which by lead 2 is connected in the usual manner to the primary radar receiver 3. At 4 is shown an auxiliary or secondary radiation receiving system having the required radiation pattern with respect to the pattern of radar antenna 1 connected in the customary manner by lead 2' to auxiliary receiver 6, which is substantially the same as the primary receiver 3. The output from auxiliary receiver 6 may be led by line 7 to an inverter 8, which inverts the output from receiver 6 so that it may be compared with the output from primary receiver 3, in addition circuit 10. The inverted output from receiver 6 is led by 9 to addition circuit 10 and the output from primary receiver 3 is led by line 11 through a compensator 12 adjusted to compensate the output signal from primary receiver 3 for any time lag in the output signal from receiver 6, due to inverter 8. As understood by those skilled in the art, the inverter 8 may be a triode, a transformer, or any vacuum tube used as an amplifier; and the compensator 12 may be any appropriate combination of resistance, capacitance and inductance to compensate for the time lag in inverter 8. From compensator 12 the signal output from receiver 3 passes through line 13 to addition circuit 10, where the output from primary receiver 3 is compared with the output from auxiliary receiver 6 so that unless the voltage from the output from receiver 3 is greater than the voltage from the output of auxiliary receiver 6, no impulse will pass from the addition circuit 10 through line 14 to the P. P. I. shown at 15, because unless it has the right direction and value it will not pass detector or pip generator 16 operating as a threshold.

It is an important feature of my invention that the primary radiation transmitting and receiving antenna system 1 and the secondary or auxiliary radiation receiving system 4 have the required relative radiation patterns. The pattern of 4 must envelop or enclose that portion of the pattern of 1 which corresponds to the unwanted directions, that is, the directions of the side lobes which cause the difficulty as described above, and the pattern of the desired directive beam must extend outward beyond the pattern of 4 so that in effect only the wanted beam gets through the pattern of 4 and the unwanted radiation from 1 is in effect enveloped by the pattern of 4. It will be understood by those skilled in the radar art, that the required radiation patterns of the primary radiation transmitting and receiving system 1 and of the secondary radiation receiving system 4 can be provided for by known methods of antenna design in accordance with the principal factors of antenna shape, horn or other feed position, aperture illumination, et cetera.

It will also be apparent that Figure 1 shows in schematic form the basic idea of the invention, whether applied to radar, radio, television, or other application. In addition to a primary antenna and a primary receiver, which may be components of a radar, there is an auxiliary receiving system comprising an antenna, used for receiving only, and an auxiliary receiver which may be identical with the primary receiver. The field pattern of the auxiliary antenna is such that its power gain is substantially less than that of the primary antenna in those directions in space from which reception is desired, and substantially greater than that of the primary antenna in all other directions in space, or particularly in those directions from which reception is specifically not desired. In the application of the invention to suppression of side lobes in pulsed radars, the rectified output pulse of the auxiliary receiver is passed through an inverter, which reverses the sign of the output voltage with respect to that normally existing at the output terminals of the two receivers. The output pulse of the primary receiver is passed through a compensator which subjects it to the same relative change in magnitude and the same time delay which may be suffered by the output of the auxiliary receiver in its passage through the inverter. The negative pulse from the inverter and the positive pulse from the compensator are then fed into an addition circuit. If the magnitude of the positive pulse is substantially greater than that of the negative pulse, which will be the case for incoming signals received in directions in which the power gain of the primary antenna exceeds that of the auxiliary antenna, a net positive output will result and this is used to trigger a pip-generator the output of which is presented on the P. P. I. or other indicator of the radar. When the magnitude of the positive pulse is less than that of the negative pulse, which will be the case for incoming signals received in directions in which the power gain of the primary antenna is less than that of the auxiliary antenna, the net output voltage of the addition circuit will be negative. When fed into the pip-generator this negative voltage will only increase, rather than overcome, the negative bias on its control device and the pip-generator will not be triggered and no signal will be transmitted to the indicator. It is evident that the effect of using the proposed auxiliary receiving system in the manner indicated, or in any equivalent manner, is the same as though the primary antenna were capable of receiving signals coming from certain desired directions contained within a certain solid angle and incapable of receiving signals from other directions.

The design of the auxiliary antenna shown at 4 in Figure 1 depends upon the directional pattern of the primary antenna 1 and upon the angular region over which it is desired to suppress the reception by the primary antenna; in other words, the desired direction or region of reception.

Figure 2:
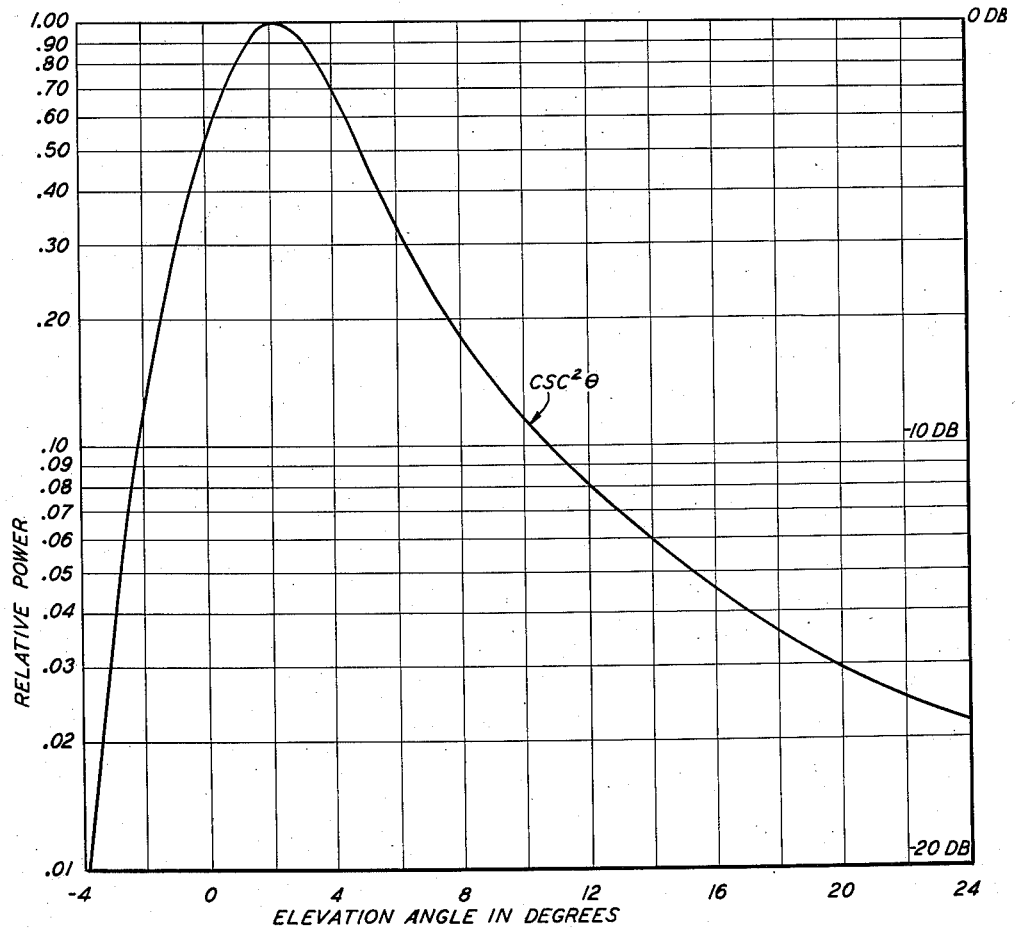
Figure 2 is a graphical representation of an elevation pattern of a typical primary antenna of the shaped paraboloid type used for surveillance.

The invention will be further illustrated by reference to a typical paraboloid-shaped surveillance radar. The shape of the $csc^2\theta$ elevation pattern of this type of shaped paraboloid antenna is shown in Figure 2, in which the relative power in arbitrary units is plotted as a function of elevation angle above the horizontal. It will be observed that there are no side lobes in the important directions plotted in the elevation pattern. A section of the azimuth pattern of this antenna is represented by curve A of Figure 3, in which power gain over an isotropic antenna is plotted against azimuth angle measured from the main lobe axis. The positions and relative intensities of the main beam and side lobes are indicated in curve A in Figure 3. The envelope of the side lobe peaks is a curve of the form $csc^2\theta$. This envelope is indicated by curve B in Figure 3, rounded off to form a smooth lobe of half-power width 3°.

Figure 3:
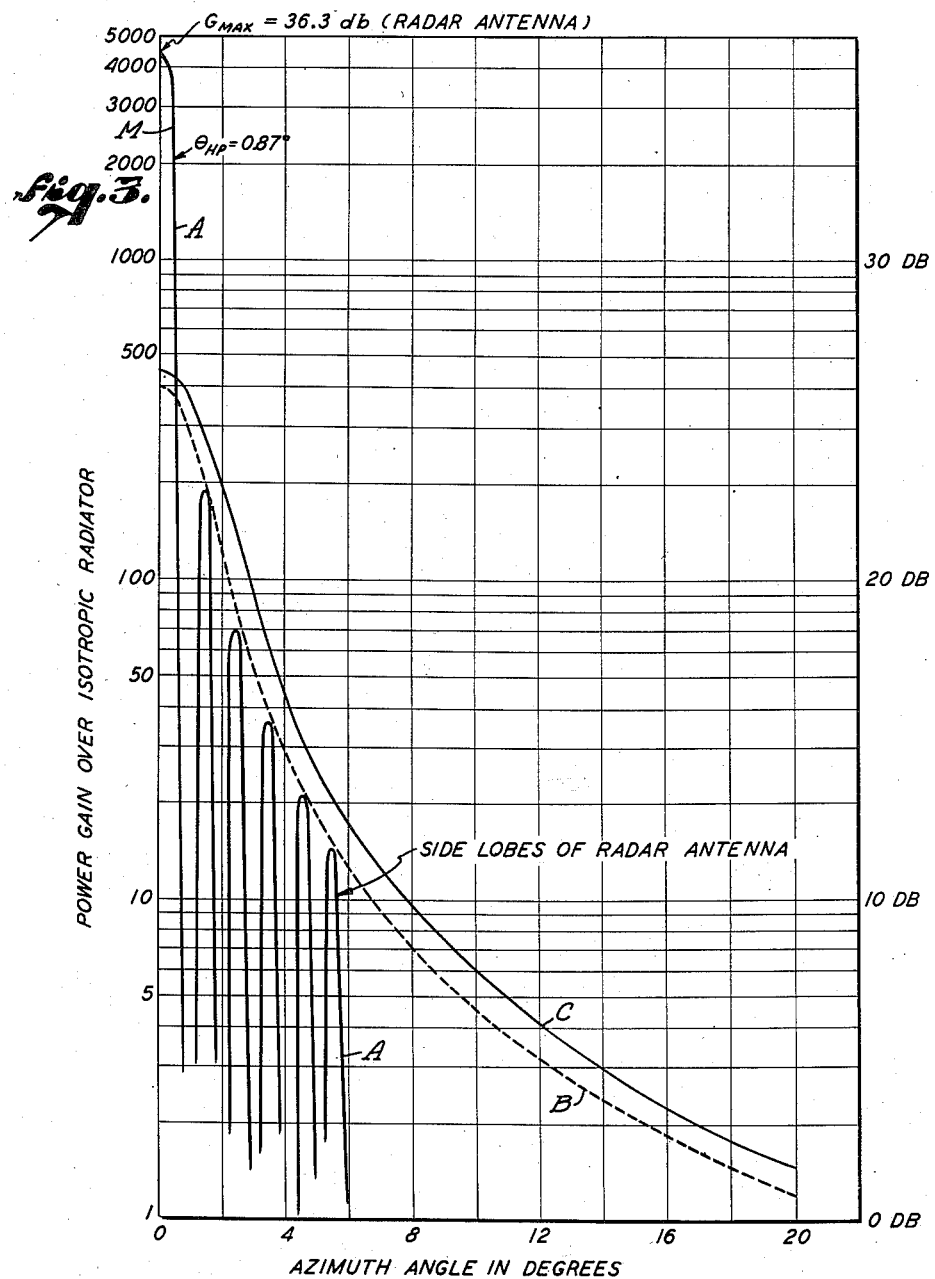
Figure 3 is a graphical representation of a section of the azimuth pattern of the same type of radar antenna as for Figure 2 showing main beam and side lobes and showing also a graphical representation of the receiving pattern of the auxiliary radar antenna in accordance with my invention.

In accordance with my invention, the auxiliary receiving antenna arrangement is designed to have a radiation pattern which will envelope the undesirable side lobes but which falls substantially short of the main lobe, shown at $m$ on Figure 3. A section of the azimuth radiation pattern of this auxiliary receiving antenna arrangement is shown as curve C on Figure 3. Curve C may also be approximately of the form $csc^2\theta$. It will be understood, of course, that Figure 3 shows only one side of the symmetrical azimuthal plane pattern and that the auxiliary antenna 4 would be so designed to have a similar pattern in azimuth on both sides of the main lobe axis of symmetry. Since there is ordinarily no side-lobe problem in the important directions of elevation, the auxiliary antenna may have the same shaped pattern in elevation as the primary antenna, that is, a $csc^2\theta$ pattern, but will, of course, have the required relative power values as shown in Figure 3.

It will be understood that the surface of the radiation pattern of the auxiliary antenna will extend in space beyond the surface of the radiation pattern of the primary antenna in the unwanted directions of reception but will fall short in the wanted directions of reception. It will also be understood that, except for practical considerations of antenna design, the radiation pattern surface of the auxiliary antenna may extend any distance beyond the surface of the primary antenna in the unwanted directions as long as there is a sufficient differential to effectively cut out reception of signals from the unwanted directions, and that, in the wanted directions, the surface of the radiation pattern of the primary antenna must extend sufficiently beyond the surface of the auxiliary antenna to have a sufficient differential to effectively operate the comparative receiving systems, as shown in Figure 1, so that signals will be adequately received in the wanted directions. Moreover, except for these requirements, the respective radiation pattern surfaces of the primary and auxiliary antennas need have no other important relationship to one another. This factor is clearly of great advantage, since it substantially relieves the design requirements and limitations of both antenna arrangements. In this connection, it will also be understood that the auxiliary antenna system may be made up physically of a number of antennas appropriately arranged about the primary antenna to obtain the required relative radiation pattern surfaces. The auxiliary receiving system may also be made up as an appropriate arrangement of horn or other feeds in conjunction with the actual primary antenna structure.

Figure 4:
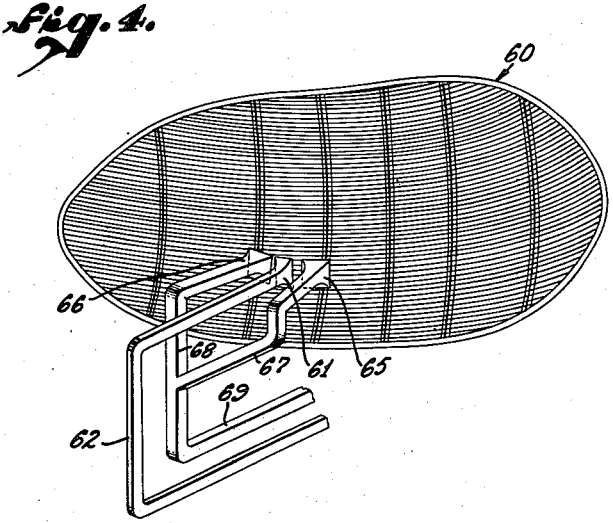
Figure 4 shows in perspective a shaped paraboloid type radar antenna having a primary horn feed receiving system and an auxiliary horn feed receiving system in accordance with my invention.
Figure 5:
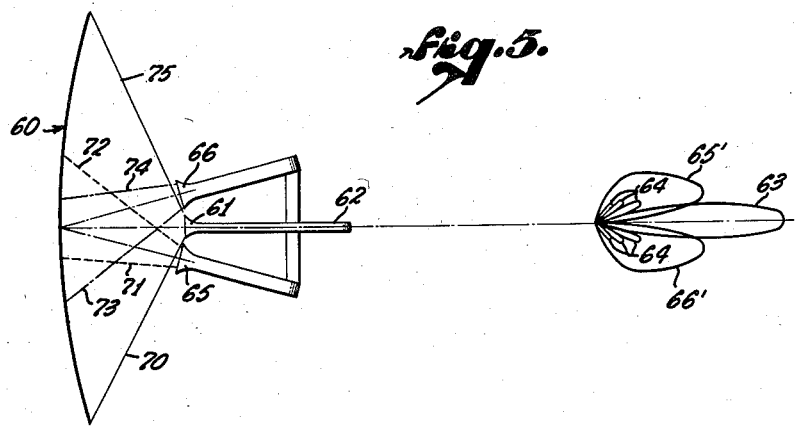
Figure 5 shows a plan cross-section of the antenna and feed horn arrangement of Figure 4 and also a plan of the horizontal radiation patterns of the two horn receiving systems.

A specific embodiment of an arrangement for obtaining the required relative radiation receiving patterns in accordance with my invention is shown in Figures 4 and 5. At 60 is shown the reflector of a typical paraboloid reflector or dish used with a feed horn 61 with wave guide lead 62. Such a usual antenna arrangement has the type of radiation pattern illustrated in Figure 2 and curve A of Figure 3. A horizontal section of the radiation pattern of this antenna arrangement is shown at the right in Figure 5 where the main beam is shown at 63 and side lobes at 64.

In addition to this usual antenna receiving system there is provided in accordance with my invention an auxiliary receiving system having the desired auxiliary receiving pattern comprising two horn feeds 65 and 66 connected by wave guides 67 and 68, respectively, merging in single wave guide 69. It will be understood of course, that these primary and auxiliary receiving systems are to be connected to such a circuitry as shown in Figure 1 by connecting wave guide 62 to line 2, in place of primary antenna 1, and wave guide 69 to line 2, in place of auxiliary antenna 4. Horn 65 will be 180° out of phase with horn 66. This may be provided for by having wave guide 67 any odd number of half-wavelengths longer than waveguide 68. The horizontal section of the patterns corresponding to horns 65 and 66 are shown at the right of Figure 5 as 65' and 66', respectively. Horn 61 is sufficiently small relative to the wavelength to yield a pattern broad enough to cover the surface of the reflector 60 with substantially uniform illumination, as indicated generally in Figure 5 by lines 75 and 70 from horn 61. Feed horns 65 and 66 are about three times the width of horn 61 and are located off the axis of the reflector with aperture planes tilted with respect to the reflector axis. These horns, because of their greater directivity will illuminate only a part of the reflector surface and that part nonuniformly because of the tilt. The limits of illumination of horn 65 are indicated by lines 71 and 72 and of horn 66 by lines 73 and 74. The resultant distant field pattern due to each of these horns will consist of a broad shaped lobe with axis displaced to the opposite side of the reflector axis, as shown at 65' and 66' in Figure 5. The intensity of each of these auxiliary lobes will be less than that of the main lobe 63 corresponding to horn 61 but much greater than the side lobes 64. It will be understood of course, that these relative field patterns can be adjusted as desired by adjusting the relative positions of the feed horns.

Figure 6:
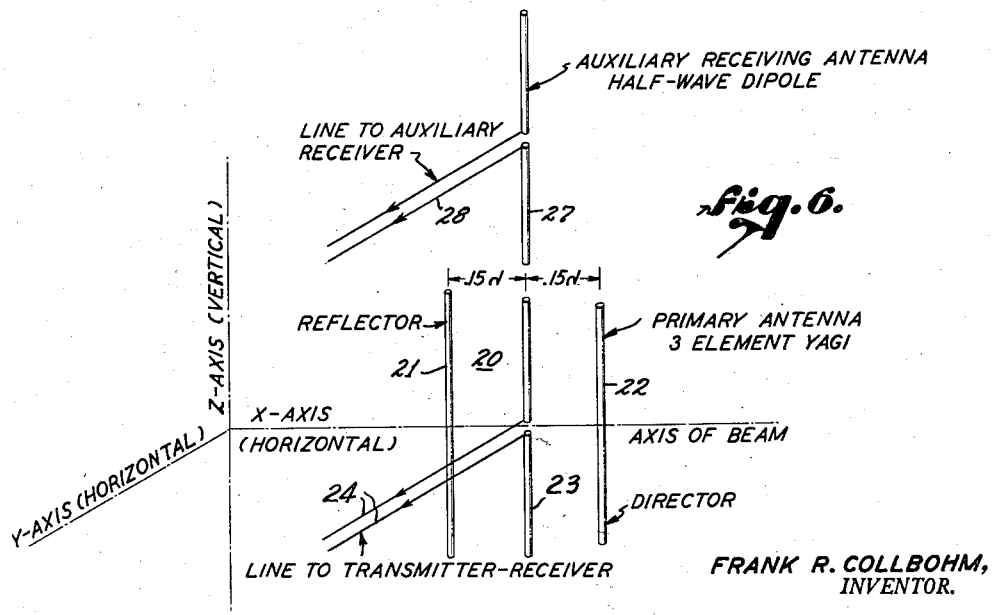
Figure 6 shows schematically a vertically arranged half-wave dipole as an auxiliary antenna, in accordance with my invention, mounted above a vertical three-element Yagi array used as the primary antenna.

Another modification, particularly of the arrangement of antennas in accordance with my invention, is shown in Figure 6. Shown generally at 20 is a primary antenna comprising a three-element Yagi having a reflector 21, director 22, half-wave dipole 23 with customary leads 24 to the receiver. Such a three-element Yagi end-fire array, consisting of a driven half-wave dipole, a reflector and a director, is frequently used in amateur radio, frequency modulation, and television receiving systems, and for some low-frequency radar purposes. Here the director is sufficiently shorter than the driver so that its self-impedance includes 20 ohms of capacitative reactance at the frequency at which the driver is resonant, and the reflector is sufficiently longer than the driver to have 30 ohms of inductive reactance at that frequency; the tthree elements are arranged in line with 0.15 wavelength spacing between elements. The field pattern of this array in the plane perpendicular to the axes of the three elements and passing through their centers (i. e. the horizontal plane, with the elements mounted with axes vertical) is shown by curve D in Figure 7. This is a plot in polar coordinates of the horizontal plane pattern in arbitrary units of field strength. This pattern consists of a quite broad frontal lobe 25 extending for about 150 degrees to either side of the array axis and a much smaller back lobe 26 occupying some 30 degrees to either side of the negative axis of the array. The maximum field-strength gain of the array is about 2.15 that of a vertical half-wave dipole.

Mounted just above the Yagi array in Figure 6 is a vertical half-wave dipole 27, preferably vertically aligned with the half-wave dipole 23. This half-wave dipole 27 has the usual lead lines 28. This dipole 27 constitutes the auxiliary receiving antenna. The radiation pattern of this antenna is also shown on Figure 7 as curve or circle E. Circle E intersects curve D at points 29 and 30. Accordingly, when the primary antenna, consisting of the Yagi array, is used as the primary antenna for the arrangement shown in Figure 1 and the half-wave dipole 27 for the auxiliary antenna 4 of Figure 1, signals will be received only from the frontal directions lying between lines 31 and 32, and any signal coming from a direction in which the radial coordinate for E is greater than for D, particularly including back lobe 26, will be cut out by the circuitry shown in Figure 1.

Figure 9:
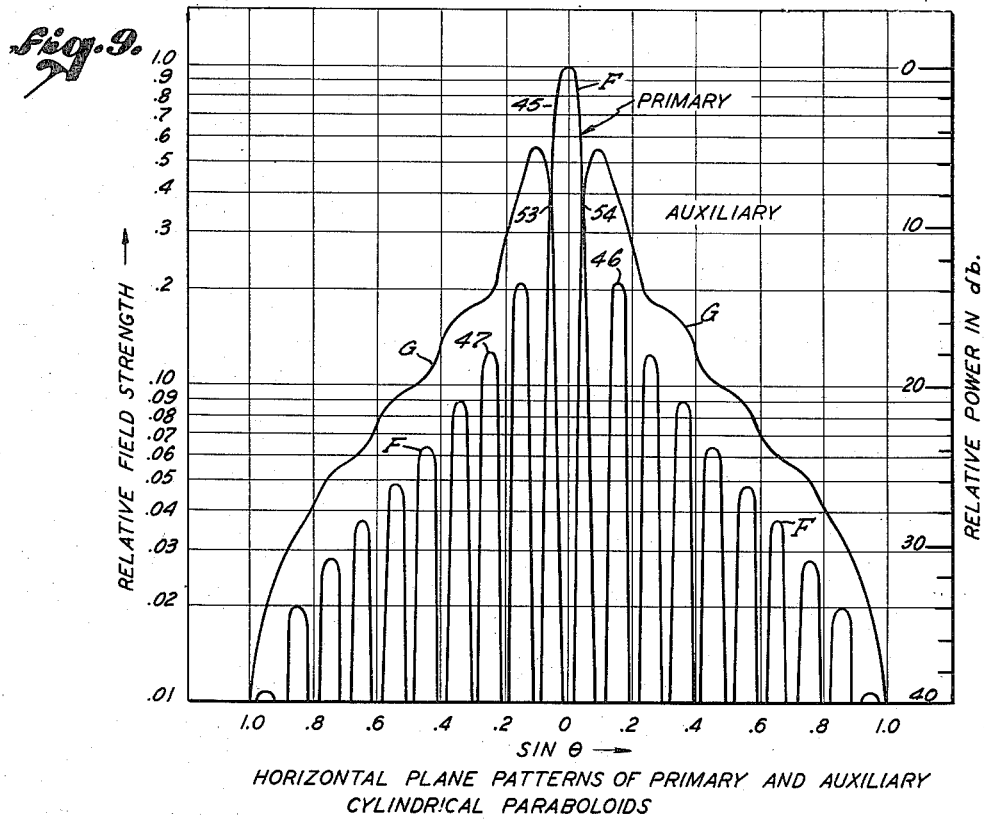
Figure 9 shows a plot of the horizontal plan patterns of the two antennas of Figure 8.

Still another modification of an arrangement of antennas, in accordance with my invention, is shown in Figure 8. At 40 is shown a cylindrical paraboloidal reflector antenna fed by a line source arranged along the focal axis. Designed for maximum gain, the illumination fo the line source is uniform, current of equal magnitude and equal phase flowing in all elements of the line source. This source comprises a collinear array of closely spaced end-loaded dipoles, the end-loading making the current distribution over each individual dipole substantially uniform, and each dipole being fed from a suitable power-dividing network or equivalent in such manner that equal and in-phase currents are supplied to the input terminals of each radiator. One of such dipoles is indicated at 41 and the others are arranged along the paraboloid, as shown. Each dipole, such as 41, has a lead line such as 42 to the network 43. This network 43 is the power-dividing network referred to above, having a lead line 44 to the receiver, such as to primary receiver 3 shown in Figure 1. The instantaneous current direction and magnitude for each of the dipoles, such as 41, is indicated under the respective dipole. The axis of the cylinder 40 is horizontal and is ten wavelengths long. The horizontal plane radiation pattern of this primary antenna is shown as curve F in Figure 9, where the relative power in decibels, that is, the relative field strength, is plotted with sine $\theta$, where $\theta$ is the azimuth angle measured from the axis of the paraboloid aperture. Curve F has a main lobe 45 and side lobes, such as 46 and 47, there being a number of such side lobes, as shown.

Figure 10:
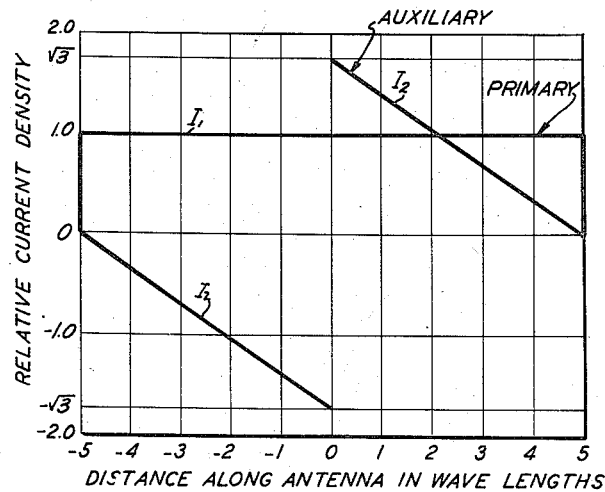
Figure 10 shows a plot representing the relative current distributions along the line sources feeding the primary and auxiliary antennas shown in Figure 8.

Arranged just above antenna 40 to rotate about the same vertical axis is an identical antenna 48 comprising a cylindrical paraboloidal reflector fed by a line source arranged along the focal axis, where the source comprises a collinear array of closely spaced end-loaded dipoles, one of which is shown at 49. Each dipole, such as 49, has a lead line, such as 50, to the network 51. Network 51 provides a current distribution to these dipoles, as indicated by the arrow and values under each dipole, and also as indicated in Figure 10, described below. Network 51 has lead line 52, which leads to the auxiliary receiver, such as shown at 6 in Figure 1.

Figure 10 shows a plot of the relative current distribution along the line sources comprising the dipoles 41 of primary antenna 40 and the dipoles 49 of the auxiliary antenna 48. Figure 10 is a plot of relative current density, with distance along the antenna in wavelengths from the central vertical axis. The line $1_1$ represents the uniforms current distribution at the dipoles 41 of the primary antenna 40. The lines $1_2$ represent the current distribution for the dipoles 49 of auxiliary antenna 48, involving a linear increase in current magnitude from each end to the center, with a shift in phase of 180° at the center. The currents $1_2$ and $1_1$ are of such magnitude that the two antennas, if used for transmitting, radiate equal total power. This results in a pattern substantially greater than that of the primary antenna throughout the side lobe regions of the primary antenna and substantially less at the position of the main lobe of the primary antenna, as shown by curve G in Figure 9. From Figure 9 it is apparent that curve G substantially envelopes the side lobes of curve F but falls substantially short of the main lobe 45 of curve F between intersecting points 53 and 54. Accordingly, when these two antennas with their respective networks are used in connection with the circuit shown in Figure 1, as described above, reception will take place only in the direction of the main lobe 45, which is fan-shaped in space.

It is to be understood that the specific embodiments given above are for the purpose of illustrating and exemplifying my invention, and the invention includes modifications within the scope of the following claims.

I claim:

1. In a directional receiving system, the combination comprising a primary radiation receiving arrangement for receiving a predetermined signal, having a primary radiation pattern in space and effective to receive signals from unwanted directions in addition to wanted directions, and auxiliary radiation receiving arrangement for receiving the same predetermined signal as said primary radiation receiving arrangement, having an auxiliary radiation pattern in space which envelops and extends beyond said primary radiation pattern in unwanted directions but which is short of said primary pattern in wanted directions, means for comparing the two received signals, and means for modifying any signal received by said primary radiation receiving arrangement with respect to any signal received by said auxiliary radiation receiving arrangement so that a signal is passed only when the signal received by said primary receiving arrangement is greater than the signal received by said auxiliary receiving arrangement.

2. In an electromagnetic radiation receiving system, the combination which comprises an antenna arrangement for receiving electromagnetic radiation, said antenna arrangement having a first means for receiving electromagnetic radiation and a second means for receiving the same electromagnetic radiation, said first means having a primary radiation pattern in space and said second means having an auxiliary radiation pattern in space, said primary radiation pattern being greater than said auxiliary radiation pattern in a directional region, means for comparing the signals received by said first and second means, and means for modifying signals received by said first means in accordance with signals received by said second means so that a signal is passed only when the signal received by said first means is greater than the signal received by said second means.

3. In a directional receiving system, the combination comprising a primary antenna arrangement having a primary radiation pattern in space and effective to receive predetermined signals from unwanted directions in addition to wanted directions, an auxiliary antenna arrangement effective to receive said predetermined signals and having an auxiliary radiation pattern in space which envelops and extends beyond said primary radiation pattern in unwanted directions but which is short of said primary pattern in wanted directions, means for comparing the signals received by said primary and said auxiliary antenna arrangements, and means for modifying any signal received by said primary antenna arrangement with respect to any signal received by said auxiliary antenna arrangement so that a signal is passed only when the signal received by said primary antenna arrangement is greater than the signal received by said auxiliary antenna arrangement.

4. In a receiving system, the combination comprising a primary antenna and an auxiliary antenna having a radiation pattern a portion of which is greater than the radiation pattern of said primary antenna, a circuit leading from said auxiliary antenna comprising a receiver adapted to receive a predetermined signal and an inverter for inverting the output voltage from said receiver, a circuit leading from said primary antenna comprising a receiver adapted to receive said predetermined signal and a compensator which subjects the output from said last-mentioned receiver to the same relative change in magnitude and the same time delay as the output from said first-mentioned receiver undergoes in said inverter, means for adding the output from said two circuits, and a threshold bias level means connected to said means for adding.

5. In a directional receiving system for receiving a single radiated signal, the combination comprising a primary radiation receiving arrangement having a primary radiation pattern in space and adapted to receive said single signal, an auxiliary radiation receiving arrangement having an auxiliary radiation pattern in space and likewise adapted to receive said single signal, said radiation patterns intersecting in a line in space determining the shape of a conical sector of a sphere extending into space and having its vertex at said receiving system within which directional reception is confined with one radiation pattern overlapping and extending beyond the other radiation pattern within said conical sector, means for comparing the signals received by said primary and said auxiliary receiving arrangement, and means for modifying signals received by said primary receiving arrangement with respect to signals received by said auxiliary receiving arrangement to nullify signals received from directions outside of said conical sector and to pass signals received from directions within said conical sector.

6. In a directional electromagnetic radiation receiving device for receiving a single radiated signal, the combination for restricting the direction of reception to a bundle of solid angles forming a conical sector of a sphere extending into space and having its vertex at the receiving device comprising electromagnetic receiving means adapted to receive said single signal and having two radiation patterns intersecting in a line in space determining the shape of the conical sector within which directional reception is confined with one radiation pattern overlapping and extending beyond the other radiation pattern within said conical sector, means for comparing the signal received from outside said conical sector with signal received from inside said conical sector, and means for nullifying signals received by said receiving means when received from a direction outside of said conical sector and for producing an output signal when such signals are received from a direction within said conical sector.

7. In a directional electromagnetic radiation receiving device for receiving a single radiated signal, the combination for restricting the direction of reception to a bundle of solid angles forming a conical sector of a sphere extending into space and having its vertex at the receiving device comprising two electromagnetic receivers both adapted to receive said single signal, having two radiation patterns intersecting in a line in space determining the shape of the conical sector within which directional reception is confined with one radiation pattern overlapping and extending beyond the other radiation pattern within said conical sector, and means for comparing the respective signals received from said two receivers and passing a signal therefrom only when the signal from said receiver having said radiation pattern overlapping and extending beyond said other radiation pattern is greater than the signal from said other receiver.

8. In a directional receiver adapted to receive a single radiated signal and having an antenna with directional pattern including main beam and smaller side lobes, the combination for eliminating reception by way of the side lobes comprising an auxiliary receiver adapted to receive the same said signal as said receiver and having an antenna whose radiation pattern envelops the side lobes but not the main beam, and means for comparing signals received from said receiver and said auxiliary receiver and passing signals only when the signal from said receiver is greater than the signal from said auxiliary receiver so that signals are passed only when received by way of said main beam and not by way of said side lobes.

9. A directional receiving system which includes: a primary antenna having a radiation pattern including a principal lobe and side lobes; a primary receiver connected to said primary antenna to receive the energy therefrom and provide a primary signal; an auxiliary antenna having a radiation pattern differing from that of said primary antenna in such a manner that when said radiation patterns are superposed, the radiation pattern of said auxiliary antenna is proportionately less in the direction of said principal lobe and proportionately greater in other directions; an auxiliary receiver connected to said auxiliary antenna to receive the energy therefrom and provide an auxiliary signal, said primary and auxiliary receivers being tuned to receive the same signal; and comparator means connected to said primary and auxiliary receivers and effective to block the transmission of said primary signal when the magnitude of said auxiliary signal is greater, corresponding to the reception of a signal by a side lobe of said primary antenna, and effective to transmit said primary signal when the magnitude of said auxiliary signal is less, corresponding to the reception of a signal by said principal lobe of said primary antenna, whereby only signals within said principal lobe of said radiation pattern of said primary antenna are transmitted.

10. A directional receiving system which includes: a primary antenna having a radiation pattern including a principal lobe and side lobes; a primary receiver connected to said primary antenna and tuned to receive the energy of a predetermined signal therefrom and provide a corresponding primary signal; an auxiliary antenna having a radiation pattern that is proportionately less in the direction of said principal lobe of said radiation pattern of said primary antenna, and is proportionately greater in other directions; an auxiliary receiver connected to said auxiliary antenna and tuned to receive the energy from said predetermined signal therefrom and provide a corresponding auxiliary signal; and comparator means connected to said primary and auxiliary receivers and effective to block the transmission of said primary signal when the magnitude of said auxiliary signal is greater, corresponding to the reception of a signal by a side lobe of said primary antenna, and effective to transmit said primary signal when the magnitude of said auxiliary signal is less, corresponding to the reception of a signal by said principal lobe of said primary antenna, whereby only signals within said principal lobe of said radiation pattern of said primary antenna are transmitted.

References Cited in the file of this patent

UNITED STATES PATENTS

| Number | Name | Date |
|---|---|---|
| 2,061,737 | Offenhauser | Nov. 24, 1936 |
| 2,212,238 | Kolster | Aug. 20, 1940 |
| 2,216,517 | Oosterhuis | Oct. 1, 1940 |
| 2,279,031 | Cockerell et al. | Apr. 7, 1942 |
| 2,424,079 | Dome | July 15, 1947 |
| 2,436,408 | Tawney | Feb. 24, 1948 |
| 2,456,666 | Agate et al. | Dec. 21, 1948 |
| 2,468,751 | Hansen | May 3, 1949 |
| 2,509,207 | Busignies | May 30, 1950 |
| 2,513,338 | Litchford et al. | July 4, 1950 |